United States Patent [19]

Parker, III

[11] Patent Number: 4,886,100
[45] Date of Patent: Dec. 12, 1989

[54] TRACTION DEVICE ADAPTED TO COMPENSATE FOR TIRE SIZE VARIATIONS RESULTING FROM INFLATION AND ROAD DEFLECTION

[76] Inventor: Thornton J. Parker, III, 4615 Ellicott St., N.W., Washington, D.C. 20016

[21] Appl. No.: 202,549

[22] Filed: Jun. 6, 1988

[51] Int. Cl.$^4$ .............................................. B60C 27/20
[52] U.S. Cl. ........................ 152/219; 152/208/225 C
[58] Field of Search ............... 152/208, 213 R, 213 A, 152/216, 219, 221, 225 C, 239, 241; 24/527, 528, 529

[56] References Cited

U.S. PATENT DOCUMENTS

| | | | |
|---|---|---|---|
| 2,655,972 | 10/1953 | Doney | 152/213 R |
| 2,912,036 | 11/1959 | Minutilla | 152/225 R |
| 2,926,717 | 3/1960 | Dunlap | 152/239 |
| 2,963,064 | 12/1960 | Rucker | 152/225 R |
| 3,186,467 | 6/1965 | Trieber | 152/226 |
| 3,736,970 | 6/1973 | Clark | 152/226 |
| 4,662,417 | 5/1987 | Lee | 152/216 |

Primary Examiner—Michael W. Ball
Assistant Examiner—Gregory J. Wilber
Attorney, Agent, or Firm—Frank A. Lukasik

[57] ABSTRACT

An anti-skid traction device adapted to being mounted on a driving wheel tire of a vehicle for obtaining greater traction on ice, snow or mud. The device comprises a set of sturdy, rigid, hooks on the outer ends, which fit over and around a tire, across the tread, and are held in place by a ring chain attached to the shank members on the outside of the tire. The shank members are adapted on the inner ends to slideably engage shank members arranged in opposed relation.

7 Claims, 2 Drawing Sheets

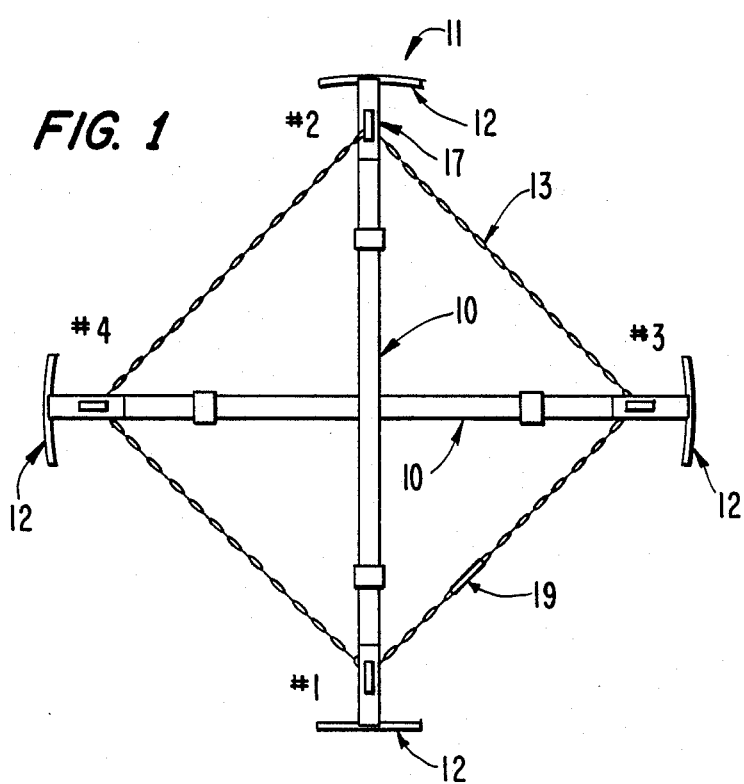
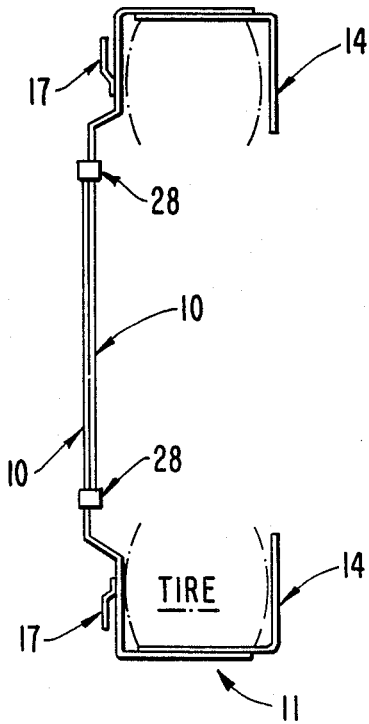
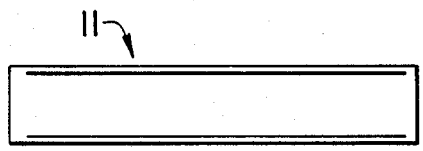
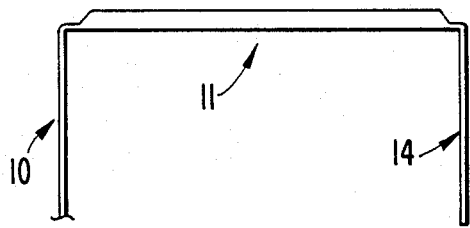
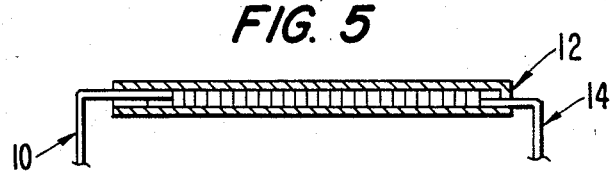
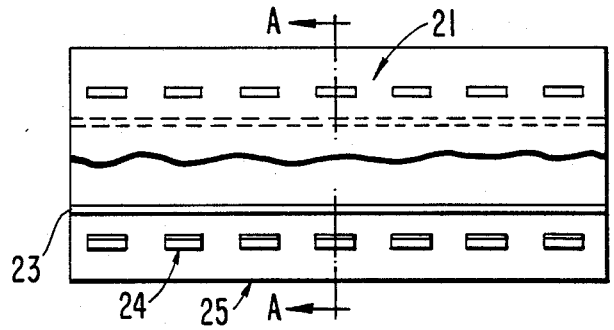
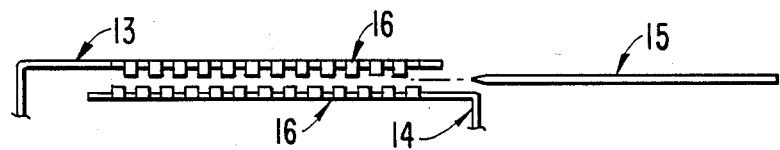

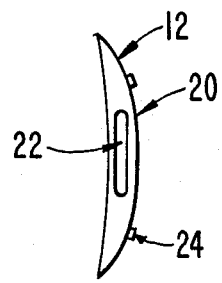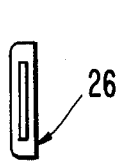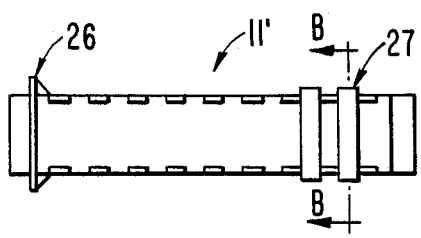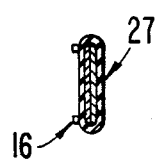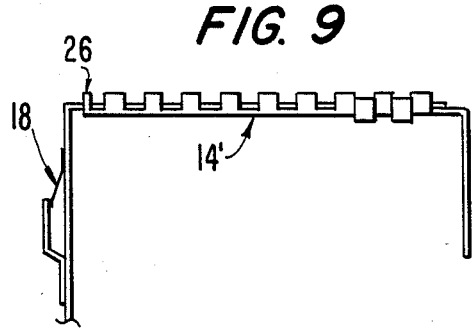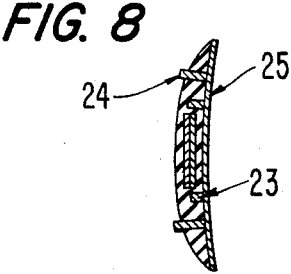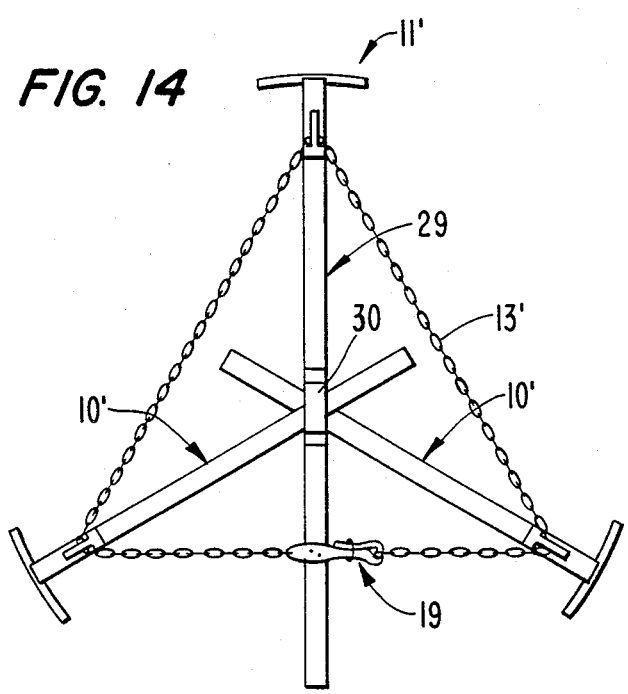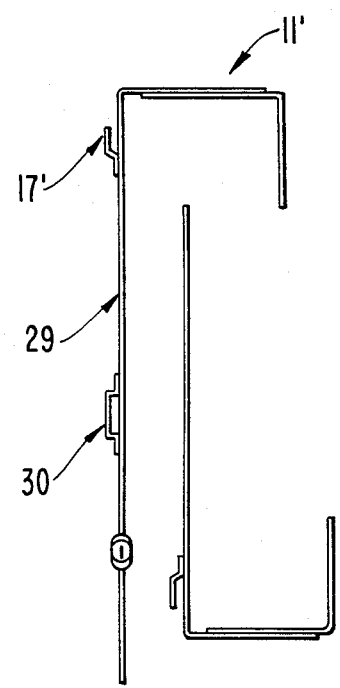

TRACTION DEVICE ADAPTED TO COMPENSATE FOR TIRE SIZE VARIATIONS RESULTING FROM INFLATION AND ROAD DEFLECTION

BACKGROUND AND FIELD OF THE INVENTION

The present invention relates generally to devices adapted to being mounted on tires on the driving wheels of vehicles to improve traction in snow, on ice and in mud, and more particularly to such devices which may be readily and quickly mounted on the driving wheels when slippery conditions are encountered and just as easily removed after the emergency has passed.

Various anti-skid traction devices are well known in the art, as exemplified by U.S. Pat. No. 2,576,868 to Wolf, U.S. Pat. No. 2,963,064 to Rucker; U.S. Pat. No. 4,209,049 to Regensburger and U.S. Pat. No. 4,662,417 to Lee. However, none of these patents provide anti-skid traction devices which are attached to tires which would not need readjustment after mounting and which have a strong, durable metal frame, a securing chain that is not subject to wear, be manufactured in relatively few sizes to fit a wide range of automobile and truck/bus tire sizes and be adaptable to single, low pressure automobile tires and dual, high pressure truck and bus tires.

All-weather and snow tires have better traction than regular tires, but they are not as good as chains in densely packed snow or ice. Normal chains, consisting of a ring on each side of the tire and traction bands that run from ring to ring, are difficult to put on, particularly under adverse conditions. The chain set must be wrapped around and under the wheel, the inside ring must be fastened, which requires one to see and reach behind the wheel, and the tension must be reset after running—all of which is hard and messy to do. Strap chains, held on by a belt which goes through a slot in a wheel, cannot be used on wheels without slots or which have inadequate clearance between the inside of the rim and the brake.

OBJECTS AND SUMMARY OF THE INVENTION

Accordingly, it is an object of the present invention to provide an improved anti-skid traction device which is attached to tires.

Another object of the present invention is to provide an anti-skid traction device which can be readily attached from the outside of the vehicle wheel.

A further object of the present invention is to provide an anti-skid traction device which can be easily mounted and dismounted without raising the tire or moving the vehicle.

It is still another object of the present invention to provide an anti-skid traction device which would not require readjustment after mounting.

A still further object of the present invention is to provide an anti-skid traction device which uses a variety of disposable traction pads for different road conditions and applications.

A still further object of the present invention is to provide an improved anti-skid traction device which is relatively simple for ease of manufacture, dependability and application.

A still further object of the present invention is to provide an improved anti-skid traction device which will wear less on dry pavement than conventional tire chains.

A still further object of the present invention is to provide an improved anti-skid traction device which may be manufactured in relatively few sizes to fit a wide range of automobile and truck/bus tire sizes.

Other objects and further scope of the applicability of the present invention will become apparent from the detailed description given hereinafter. It should be noted however, that the detailed description and specific examples, while indicating preferred embodiments of the invention, are given by way of illustration only, since various changes and modifications within the spirit and scope of the invention will become apparent to those skilled in the art from this detailed description.

The anti-skid traction device of the present invention comprises a set of sturdy, rigid, hooks which fit over and around a tire, across the tread, and are held in place by a ring chain on the outside of the tire. The ring chain causes the entire anti-skid device to tighten if there is a tendency for the tire to slip inside the hooks as, for example, when greater traction is obtained, whereby the traction device of the present invention enhances the traction and gripping power in ice, snow, mud, curves and the like. A particular feature of the present invention is that the anti-skid device can be easily installed and removed from the tire.

BRIEF DESCRIPTION OF THE DRAWINGS

The present invention will become more fully understood from the detailed description given herein below and the accompanying drawings which are given by way of illustration only, and thus are not limitative of the present invention, and wherein:

FIG. 1 is a side view of the anti-skid traction device of the present invention.

FIG. 2 is an end view of the anti-skid traction device of the present invention.

FIG. 3a is a top view of a first embodiment of the present invention.

FIG. 3b is a side view of a first embodiment of the present invention.

FIG. 4 is a side view of an adjustable anti-skid device of the present invention, prior to assembly.

FIG. 5 is a side view of a pad member in section and an adjustable anti-skid device of the present invention, fully assembled.

FIG. 6 is a (top) view of an anti-skid member showing protruding studs.

FIG. 7 is an end view of anti-skid member showing protruding studs and opening for mounting.

FIG. 8 is a cross-sectional view of A—A of the interior of a pad member showing reinforcing plate with studs.

FIG. 9 is a side view of a modified form of the assembly of the present invention.

FIG. 10 is a top view, with section B—B, of a modified form of the assembly of the present invention.

FIG. 11 is an inside end view of a modified form of the assembly of the present invention.

FIG. 12 is a cross-sectional view of B—B of a modified form of the present invention.

FIG. 13 is an outside end view of the female part of a two part assembly of a modified form of the present invention.

FIG. 14 is a side view of a modified traction device of the present invention.

FIG. 15 is an end view of a modified traction device of the present invention.

DETAILED DESCRIPTION OF THE INVENTION

Referring now to the drawings, for the purpose of illustrating the invention, the traction device, according to the invention, comprises shank members 10, hook members 11, pad members 12 and chain 13; as shown in FIGS. 1 and 2.

In one form of the invention, the hook member 11, may be formed on one end of a shank member 10, by bending rod steel or stamping sheet steel in the form of a "U" shape as shown in FIG. 3. The hook member 11, as shown, provides traction on packed snow or on ice, but it may also be used to hold pad members 12 in place. Various types of pad members 12 may be customized for specific use on ice, new snow, partially cleared roads and in mud as shown, for example in FIGS. 5, 6 and 10. Hook member 11 would need to be sized to fit snugly on a narrow range of tire sizes and a variety of sizes would be required to fit the wide range of tires, from subcompact to large.

In a preferred embodiment, the hook member 11 is formed by bending shank member 10 at a 90° angle on one end and "L" shaped extension 14 arranged in an opposed relationship, held in position by pad member 12 as shown in FIG. 5. In assembly of the variable width hook member 11, the user approximates the width of the driving wheel by sliding pad member 12 over extension 14 and inserting spreader 15 into the slot formed by bending tooth-shaped projections 16 formed on shank member 10 and extension 14, then sliding the pad member over the end 13 of the shank member 10 until the tire width is obtained. For convenience, generally a spare tire, if the same size as the driving tires, may be used to obtain the necessary width to provide a tight fitting relationship between the tire and the hook member 11. In order to provide for a quick assembly when an emergency occurs, such as slippery roads, the anti-skid device may be assembled before storage.

The shank members 10, extend from the outside end of the hook member 11 to the far side of the tire where they may rest against the sidewall. The shank members 10 may be made as a continuation of the hook members 11, but they are identified separately because of their function and to ease the description. There is a lug 17 at the hook end of each shank member 10 for connecting the chain 13. For safety, a spring 18 may also be attached, to prevent the chain 13 from falling off lug 17 as shown in FIG. 9.

The chain 13, forms a ring around the outside face of the tire, holding the hook member 11-shank member 10 sets against the tire. As a minimum, at least three sets must be used, as shown in FIG. 14, so the chord between any two hook members 11 is shorter than the tire diameter. The ends of the chain 13 are connected with a tension fastener 19 after the hook members 11 are in place as shown in FIGS. 1 and 14. This arrangement permits easy mounting of the traction device of this invention on a wide range of tire diameters.

The pad members 12 may be made of steel reinforced rubber 20 with threads and traction lugs on the road side shown 21 in FIGS. 6–8. Each pad member 12 may be curved to the tire contour and contain a transverse slot 22 to accommodate assembled hook member 11 and extension 14. Section A—A in FIG. 6 shows a pad member section without rubber 20 to reveal reinforcing rib 23 and studs 24 which may be welded on base 25 or formed during stamping or forging. Studs 24 may also be tipped with carbide to prolong their effectiveness.

FIGS. 9 and 10 depict an alternative hook member 11 assembly shown as hook member 11'. In this embodiment, extension 14' is formed with a slotted, upturned end 26, FIG. 13, which fits over shank member 10 and is adjusted to fit the proper tire size. Bands 27, made of elastic material, may then be placed over the assembled hook member 11 to retain both members in a fixed position as shown in FIGS. 9 through 12.

The traction device depicted in FIGS. 1 and 2 would be used primarily for automobiles with low pressure, radial tires and where a variety of ornamental wheel coverings may be used. In this type, a pair of hooks 11 are held on opposite sides of the tire by clamps 28 that hold their parallel shank members 10 and permit the shank members 10 to slide in and out to compensate for varying tire size due to inflation and road deflection. At least two pairs of shank members 10 would be required for each wheel.

To install the traction device of the invention, as illustrated in FIG. 1, a first hook member 11 of a first pair of hook members 11 (Nos. 1 and 2) would be placed near where the tire touches the road surface, and the second hook member 11 would be placed over the top of the tire opposite the first. One loop of the chain 13 would be placed over the lug 17 of the second hook member 11 with the tension fastener 19 hanging free. The third hook member 11 (on the second pair of traction devices (Nos. 3 and 4)) would be placed on the ground on the opposite side from the first hook member 11 and the fourth hook member 11 would be held in place as chain 13 is attached to lug 17. The chain 13, would then be attached to the lugs 17 of the first and third hooks and secured with the tension fastener 19.

The alternative embodiment of the invention, depicted in FIGS. 14 and 15, is readily adaptable for large vehicles and is mounted in individual sections, rather than pairs, to minimize the weight that must be lifted at one time—a factor for female bus drivers. It is also for use with high pressure tires that have less ground deflection effect. It can be made for dual or single wheels. The single version may be used on the outside wheel of a dual set. A master shank member 29 differs from shank member 10 only in that it has an elongated ring 30 attached to the master shank member 29 near the centerline of the vehicle axle. To mount the traction device, the master hook 11' is placed over the top of the tire with its master shank 29 hanging down. The center of the chain 13' is looped on the lug 17' of the master shank member 29. The shank 10' of a second traction device is inserted in the elongated ring 30, and when the chain 13' is attached to its lug 17, it hangs in place with the chain 13' tight. A third traction device is attached in a similar manner. The two ends of the chain 13' are fastened at the bottom with a tension fastener and the mounting is complete. The entire assembly, including the chain 13' and the elongated ring 30 allow the shanks 29, and 10' to shift as they must.

Many variations of the invention are possible such as welding traction lugs on the hook members 11 or forming them in a "U" shape to double the traction surface. The rim ends of the hook member 11 may have rubber coverings to protect painted surfaces and multiple hook member 11 may be connected to a segment of chain 13. The hook members 11, although described as providing traction, may also be used to hold disposable traction attachments in place. Special attachments may also be made for use on trailer wheels to improve braking or the front wheels of tractors to improve steering.

I claim:

1. An anti-skid traction device adapted to being mounted on a vehicle tire quickly, from either side of the vehicle without raising or moving said tire comprising:

at least three shank and hook members in a spaced relationship with each other, anti-skid hook members disposed at each of the radial outer end portions of said shank members adapted for transverse engagement across the thread surface of said tire at peripherally-spaced points, said shank adapted at each of the inner end portions to slideably engage shank members arranged in opposed relation to permit the shank to freely slide to compensate for tire size variations resulting from inflation and road deflection, and a flexible tension member adapted to effect equi-distant arrangement of said anti-skid members and to resist movement by tightening all said anti-skid members along the periphery of said tire when said anti-skid members are in contact with the ground.

2. An anti-skid traction device according to claim 1 further comprising securing means carried by the outer walls of said shank members and adapted to receive therein the inner end portions of said opposed shank members when the device is mounted on a vehicle tire.

3. An anti-skid traction device according to claim 2 comprising three shank members and wherein said securing means is carried on a single shank member.

4. An anti-skid traction device, according to claim 2, wherein said anti-skid members are adapted for adjusting the length thereof whereby the device can be further adjusted for varying tire widths.

5. An anti-skid device, according to claim 4, wherein said anti-skid members are adapted to receive pad members to provide greater traction.

6. An anti-skid traction device, according to claim 5, wherein said pad members comprise steel reinforced rubber having treads and traction lugs on the road side to establish greater traction with the road.

7. An anti-skid traction device according to claim 5 wherein said anti-skid members comprise a pair of engaged rack toothed sections held together by a plurality of elastic bands to provide adjustable width and greater traction.

* * * * *